United States Patent [19]

Taylor

[11] Patent Number: 4,814,087

[45] Date of Patent: Mar. 21, 1989

[54] FUEL DELIVERY SYSTEM

[75] Inventor: John A. Taylor, Pinckney, Mich.

[73] Assignee: Separation Dynamics, Inc., Southfield, Mich.

[21] Appl. No.: 107,261

[22] Filed: Oct. 9, 1987

[51] Int. Cl.[4] .............................................. B01D 13/00

[52] U.S. Cl. .................................... 210/641; 123/510; 123/514; 210/651; 210/321.89; 210/500.21; 210/500.23; 210/500.27; 210/500.29

[58] Field of Search ...................... 210/321.89, 500.21, 210/500.23, 641, 651, 500.27, 500.29; 123/510, 514

[56] References Cited

U.S. PATENT DOCUMENTS 2,611,490 9/1952 Robinson ........................... 210/651

3,556,990 1/1971 Gulko ................................ 210/651

4,313,830 2/1982 Tulin et al. ......................... 210/651

*Primary Examiner*—Peter Chin

*Attorney, Agent, or Firm*—Reising, Ethington, Barnard, Perry & Milton

[57] ABSTRACT

A fuel delivery system (10) includes a fuel tank (12) for storing a supply of fuel (16) and conduits (18) for conducting the fuel (16) from the fuel tank (12) to an engine (20). A separator module (22) in fluid communication with the conduits (18) separates by cross-flow separation a substantially water and particle free fuel permeate flow from a fuel retentate flow. The conduit (18) includes a first passageway (24) conducting the fuel permeate flow to the engine (20) and a second passageway (30) conducting the fuel retentate flow back to the fuel tank (12).

24 Claims, 1 Drawing Sheet

FUEL DELIVERY SYSTEM

TECHNICAL FIELD

The present invention relates to a system of the type for separating dry, particulate free hydrocarbon fuel and water from a fuel source. More specifically, the present invention relates to a fuel delivery system for supplying dry, particle free fuel from a fuel tank to an engine.

BACKGROUND ART

A number of devices exist that are able to remove suspended water, but not particulate matter from liquid and gaseous fuels. For example, in a fuel delivery system for a diesel fuel line, a supply tank is in fluid communication through conduits to a fuel injector, the fuel injector being in fluid communication with the engine for injecting fuel into the engine. Pumps are disposed between the fuel tank and injector for pumping fuel from the fuel tank to the injector. Generally, means are provided between the fuel tank and injector for filtering particulate matter from the fuel and for removing water from the fuel. There is also generally an overflow system for conducting overflow fuel from the injector back to the fuel tank.

A number of devices exist that are able to remove suspended water from fuels. Among these processes are coalescing devices and electro static percipitators. Dissolved water has been removed from hydrophobic liquids and gaseous with conventional processes that employ sorbents and desiccants. All of these conventional decontamination systems require maintenance. For example, the removal of suspended water from fuels is sometimes accomplished utilizing a coalescing device. These coalescing devices become filled with water during operation and must be maintained carefully to prevent water from being pumped with the fuel to the point of use.

Dissolved water can be removed from fuel streams using various water adsorbing media. The water adsorbing media must be discarded after the media becomes saturated with water or regenerated with the consumption of energy which adds to the cost of the process.

None of the aforementioned devices can remove suspended and dissolved water and dirt particles from fuels by themselves simultaneously.

Numerous types of filtration devices exist that can remove dirt particles from fuel streams but these filters eventually become clogged and must be replaced. Conventional filters intercept particulate matter and ultimately build up a filter cake that leads to a build up of back pressure to the extent that flow is restricted and the filter must be replaced. Conventional particle filters cannot remove suspended or dissolved water and possess a limited service life for particle removal.

These filters are commonly referred to as "dead end" filters because particle and water impact directly upon the filter media. The media acts as barrier, intercepting particles according to its design. These filters must balance particle holding capability and service life. A conventional filter with a relatively tight media will stop particles in the submicron range but possess a relatively short service life. Therefore, a trade-off must be made between service life and filter efficiency. The practical result is that the most efficient removal of particles is frequently not achieved. Moreover, relatively frequent change out of the filter device is necessary with conventional filters depending upon their particle holding efficiency. Often change-out is done after the filter has clogged and thereby represents a maintenance issue and a costly shut down of the assembly as well as the creation of uncertainty regarding possible damage to system parts due to filter failure. These type of filters present a variable of particle contamination and do nothing to prevent moisture problems.

The present invention provides means for effectively decontaminating a fuel of water and particulate material in a single pass. The present invention further provides a means of then removing dissolved water and dissolved water soluble components from either the fuel retentate flow or fuel permeate flow, all separation steps being accomplished in a single pass of the fuel flow through the separation devices. Accordingly, the present invention provides an extremely efficient means of providing a fuel decontaminated of water and particulate material as well as providing a means of deriving a fuel free water permeate.

SUMMARY OF THE INVENTION

In accordance with the present invention, a fuel delivery system for supplying fuel from a fuel tank to an engine is provided, the system including fuel tank means for storing a supply of fuel, conduit means for conducting the fuel from the fuel tank means to the engnne, and first tangential flow separator means in fluid communication with the conduit means for separating by crossflow separation a substantially water and particle free fuel permeate flow from the fuel retentate flow. The conduit means includes a first passageway conducting the fuel permeate flow to the engine and a second passageway conducting the fuel retentate flow back to the fuel tank means.

The present invention further provides a method for delivering fuel from a fuel tank to an engine, the method including the steps of drawing the fuel from the fuel tank, spparating a substantially water and particle free fuel permeate flow from the drawn fuel rentate flow, conducting the substantially water and particle free fuel permeate flow to the engine, and conducting the retentate fuel flow back to the fuel tank.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
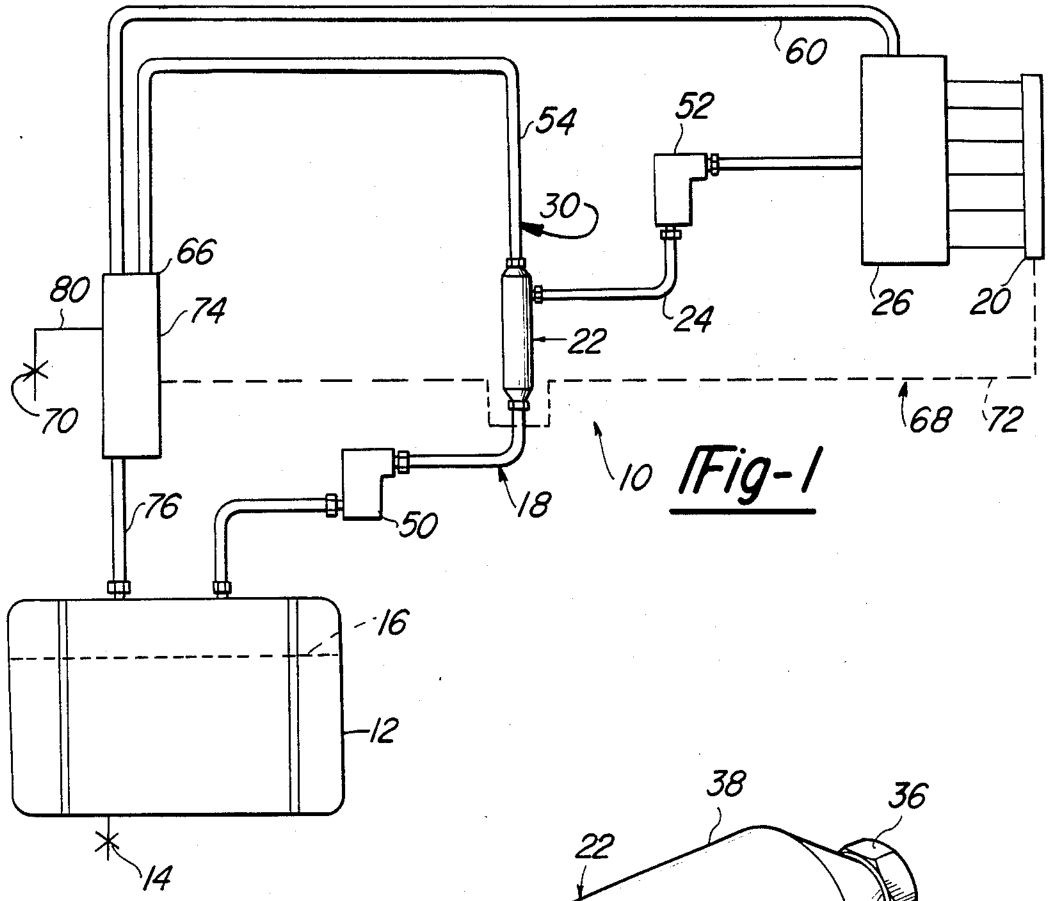
FIG. 1 is a schematic diagram of a fuel delivery system constructed in accordance with the present invention.

A fuel delivery system constructed in accordance with the present invention is generally shown at 10 in FIG. 1.

Generally, the system 10 includes a fuel tank 12 having a drain 14. The tank 12 stores fuel 16 therein. The fuel 16 could be one of various types of fuel, such as gasoline, diesel fuel, jet fuel, or others, depending upon the environment in which the present invention is used. In the preferred embodiment, the invention is illustrated in a diesel engine fuel supply system, and accordingly, the fuel shown is diesel fuel 16. Such fuel is generally includes water, dissolved and suspended, and particulate matter therein. Conduit means generally indicated at 18 conducts the fuel 16 from the fuel tank 12 to the engine 20. The present invention is characterized by including first tangential flow separator means, generally indicated at 22, in fluid communication with the conduit means 18 for separating by cross-flow separation a substantially water and particle free fuel permeate flow from a fuel retentate flow. The conduit means 18 includes a first passageway 24 conducting the fuel permeate flow to an injector 26 which injects fuel through conduits 28 to the engine 20, and a second passageway generally indioated at 30 conducting the fuel rentate flow back to the fuel tank 12.

Figure 2:
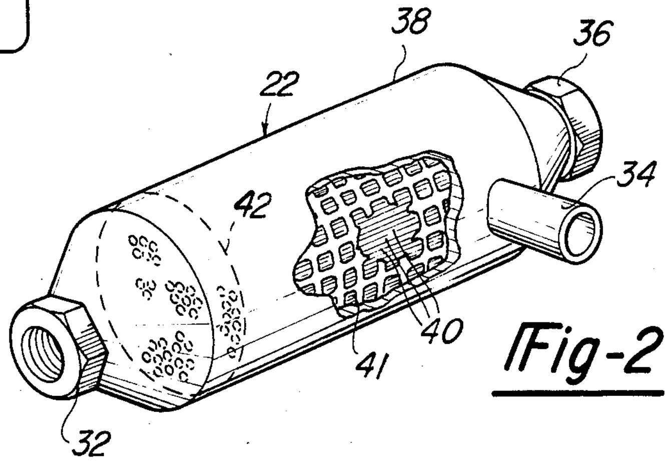
FIG. 2 is a side elevational view partially broken away of a filter assembly constructed in accordance with the present invention.

More specifically, the tangential flow separator means includes at least one separator module, as shown in FIG. 2. The separator module 22 includes an inlet 32, a first outlet 34 in fluid communication with the first passageway 24 and a second outlet 36 in fluid communication with the second passageway 30. The separator module 22 includes an outer housing 38 containing a plurality of hollow hydrophobic microporous membrane fibers 40 contained as a bundle within a polyurethane tube sheet 41. The fibers 40 are embedded in a potting material 42 adjacent the inlet 32. Each fiber 40 includes a hollow core 42, the fiber 40 having an inner surface 44 extending about the hollow core 42. Each fiber 40 also includes an outer surface 46. The hollow cores 42 of the fibers 40 define a plurality of first chambers in fluid communication between the inlet 32 and second outlet 36 thereby defining a first flow path through the separator module 22. The housing 38 in combination with the outer surfaces 46 of the fibers 40 define a second chamber in fluid communication with the first outlet 34. The membrane fibers 40 are microporous membranes 40 separating the first and second chambers. The membrane fibers 40 extend parallel to the first flow path illustrated by the arrow 48 in FIG. 3 and tangentially contact the length of the flow path 48.

The fibers 40 can comprise a homogeneous layer of microporous material made from hydrophobic materials such polypropylene and tetrafluoroethylene fluorocarbon resins. The resins included in this group must be extremely resistant to degradation in the presented environment of hydrophilic elements such as water and dissolved water soluble components, as well as in the hydrocarbon environment of the fuels.

For example, a 10 inch module can contain 197 hollow fibers having an inner diameter of 0.6 millimeters and an average pore size of 0.20 microns. A 20 inch module can contain 440 hollow fibers having an inner diameter of 0.6 millimeters and an average pore size of 0.20 microns. All values are ±10 percent.

The system 10 includes a plurality of pumps for actively pumping fuel from the fuel tank 12 and through the conduit means 18 to the engine 20 at an axial flow rate of about 1 meter per second to 3 meters per second. The feed flow of the fuel in the system 10 can be from 1 gallon per hour to 65 gallons per hour or higher. The flow of fuel permeate through conduit 24 can be approximately 60% of the feed flow fraction pumped from the fuel tank 12 through the separator module 22.

The system 10 can include a primary pump 50 operatively connected to the conduit means 18 between the fuel tank 12 and the separator module 22. A second pump 52 can be operatively connected to the conduit 24 between the separator module 22 and the engine 20. The second passageway 30 can include a first conduit 54 operatively connected to a second conduit 56 through a one way valve 58. The conduit means 18 can further include a third passageway 60 in fluid communication between the fuel injector 26 and the fuel tank 12 for conducting overflow fuel from the fuel injector 26 to the fuel tank 12. Alternatively, a T-type valve in combination with the appropriate check valves can operatively connect the third passageway 60 to the second passageway 30 and conducts only one way fluid flow from the third passageway 60 to the second passageway 30. The flow from the third passageway 60 is conducted to the conduit 56 for travel back to the tank 12. The check valve would prevent back flow of the fuel from the third passageway 60 into the conduit 54.

Figure 3:
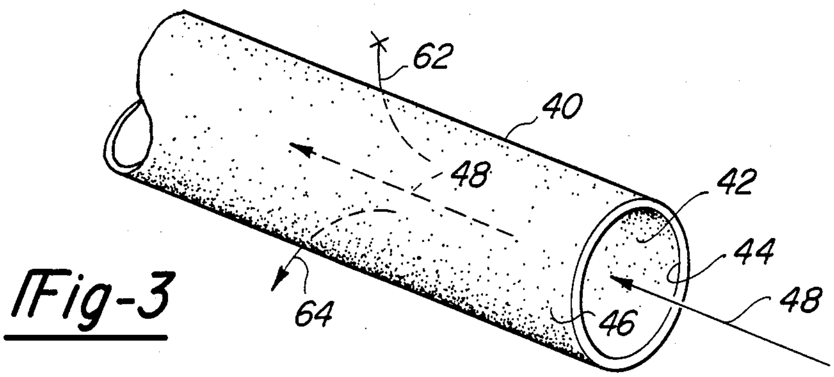
FIG. 3 is a fragmentary cross sectional view of a hollow fiber illustrating tangential flow separation.

Unlike prior art assemblies which require a coalescing device and a separate conventional filter device, the present invention provides a single separation device which separates a flow of substantially water and particle free fuel from a fuel retentate flow. This is accomplished by the cross-flow hollow fiber membrane system employed in the separation module 40. The cross-flow separator is illustrated in FIG. 3. The fuel flows along path 48. The permeate flows tangentially, as indicated by arrows 62,64, the hydrophobic microporous membrane permitting the passage of hydrocarbon fuel therethrough yet rejecting particles and hydrophilic materials, such as water from passage therethrough. The average pore size of the separation membrane is 0.2 microns (±10 percent). However, removal of contamination from the fluid stream 48 does not depend upon the pore size of the membrane, but on the velocity of the movign stream tangential to the membrane surface. The cross-flow system takes advantage of well known physical phenomena wherein particles suspended in the fluid stream 48 flowing at certain velocities and shear rates through the cylindrical geometry of the fibers 40 will tend to concentrate near the center of the flow stream and away from the inside wall surface 44. Accordingly, there is no caking of the particulate material on the inner surfaces 44 of the fibers 40. The hollow fiber microporous membranes are freed of any particulate or matter that may occasionally settle upon the membrane during shut down with a simple back pulse of a few seconds duration on start-up. Tests have shown that the fluid dynamics of the membrane allow the system to handle solid loadings of a few parts per million to 15% or higher over long periods without significant reduction in flow rate. Fuel flow rates may range from a few gallons to over a thousand gallons per minute. These fluid dynamics allow for sufficient and significant fuel permeate flow having a significantly low degree of water or particle contamination.

As shown in FIG. 1 the system 10 can include second tangential fluid separator means generally indicated at 66. The second separator means includes diffusion means consisting essentially of unsupported, nonporous cuproammonium regenerated cellulose hollow fiber membranes having continuous noninterrupted inner and outer surfaces for allowing only diffusion of water and dissolved water soluble components from the retentate fuel flow through one of the surface of the membranes. The system 10 includes water removing means generally indicated at 68 for removing water from the other surface of the hollow fiber membranes to an exhaust dump 70.

More secifically, the engine 20 includes an exhaust conduit 72 which conducts engine exhaust to and from a second separator module 66. The cellulose hollow fiber membranes contained within the separator module 66 have outer surfaces and hollow inner cores. The housing 74 of the separator module 66 in combination with the outer surface of the fibers defines an outer chamber in fluid communication with conduit 56 and conduit 76 leading from an outlet 78 in the separator module 74 to the fuel tank 12. The inner core of the cellulose fibers within the separator module 66 are in fluid communication with the exhaust conduit 72 and a second exhaust conduit 80 leading to the dump 70. The exhaust conduit means 68 conducts engine exhaust to and from the separator module 66, the exhaust conduit means 72 being in fluid communication with the inner cores of the cellulose membranes for providing a sweep stream of engine exhaust tangentially across the inner surface of the cellulose fibers and out of the system. In a diesel engine vehicle, the dump 70 can be the ambient environment into which exhaust fumes carry water separated from the fuel retentate. Other systems can be contemplated where it may be desirable to exhaust water purified from a hydrocarbon contaminent. The present invention provides such a means for first separating a quantity of hydrocarbon from the fuel flow by utilization of the first separator module 22 and then separating out an uncontaminated water flow utilizing the second separator module 66.

Alternatively, or in addition thereto, the separator module including the cuproammonium regenerated cellulose membranes can be positioned in fluid communication with the first passageway 24 for removing any dissolved water from the fuel permeate derived from the first separator module 22. In this matter, bone dry hydrocarbon fuel can be supplied to the engine 20.

The following examples illustrate the capacity of the present system to operate wherein the first and second separator module 22,26 are in series.

EXAMPLE 1

An in-line hollow fiber membrane apparatus containing a first stage microporous membrane separator having polypropylene membranes and also having a second stage membrane separator comprised of cuproammonium regenerated cellulose hollow fibers was inserted in the line of a system to test removal of suspended particulate matter and water and also the removal of dissolved water from diesel fuel.

The membrane separation device was fitted with an electric fuel pump. Diesel fuel from a 55 gallon drum was used to represent a fuel tank of a truck. Diesel fuel was pumped through the separtion device first stage inlet and allowed to flow inside the polyproplylene microporous hollow fibers. Permate fuel from the first stage separator was continuously allowed to flow over the outside of the cuproammonium hollow fibers in the second stage separator. Measurement of suspended or free water in the first stage permeate fuel were made using a Gammon water analyser according to the ASTM method D-2276/IP-216. Retentate from the first stage separator was allowed to flow back to the drum. Fuel discharged from the second stage cuproammonium cellulose membrane device was measured for water content. Particle counts were made on fuel samples before entering the system and on fuel leaving the second stage separator. The cellulose hollow fiber device was fitted with a small air pump to remove water that collected on the inside surfaces of the hollow fibers. Water was added to the diesel fuel in a concentration of approximately 5 percent by volume. This contaminated fuel flow circuit was called the retenate side and was fitted with a sampling port. A quantity of AC fine test dust was also added to the 55 gallon drum of diesel fuel. The permeate diesel fuel from the second stage separator was also directed to a sampling port. Dissolved water levels of the permeate fuel were measured using a Karl-Fischer instrument. Particles were measured using a Hiac particle counter. In actual in-line usage on a typical truck or car, clean dry fuel (permeate) will be directed to a positive displacement pump which, in turn, will feed the fuel injectors on the diesel engine.

| Results: | Water in Diesel Fuel Before Separator | Water in Diesel Fuel After Separator |
|---|---|---|
| | 24,998 ppm | 6 ppm |
| Particle Count: | Before Separator | After Separator |
| | 357,000/100 ml | 187/100 ml |

Particles were measured over the range of 1 micron through 100 microns. Total particles per 100 ml of samle reported.

Thus, a simple hollow fiber membrane cross-flow process containing both microporous hollow fiber membrane and a cuproammonium regenerated membrane is able to remove all suspended water, remove suspended particulate matter to below generally accepted specifications and also remove nearly all dissolved water from diesel fuel and allow clean, dry fuel to be fed to the engine.

EXAMPLE 2

A sample of type JP-5 jet fuel was obtained from the U.S. Navy. (The test apparatus was the same as that used in Example 1 except that a 10 gallon stainless steel reservior was used in place of the 55 gallon drum). One gallon of sea water was added to approximately 5 gallons of JP-5. Determinations of water content of the JP-5 were made after once passing through the polypropylene microporous membrane module and again after passing through the cuproammonium regenerated cellulose membrane module. Particulate matter in the form of AC-fine dust was added to the JP-5 fuel in a concentration of about 1 percent by weight.

| Results: | JP-5 Before Separation | JP-5 After Separation |
|---|---|---|
| | 28.7% water | After polypropylene microporous membrane 1st stage = 80 ppm* After cuproammonium cellulose membrane 2nd stage = 4 ppm |
| | 1.88% particles | Approx. 70** See data shown in Table 1 of 10-1A-17 Navair Specification |

*These data are slightly higher than the theoretical saturation of water in JP-5 at the temperature of 73 degrees F. at which the water test was run (see FIG. 2).

**These data are a result of the average of three replicate tests and probably reflect inadvertant airborne particle contamination of the sample.

EXAMPLE 3

A sample of type Jet-A jet fuel was obtained from the FAA. The same test apparatus was used as in Example 2. Water was added to a five gallon sample of Jet-A aviation fuel in a concentration of about 1000 ppm and particulate contamination in the form of iron oxide was added in a concentration of about 500,000 particles per 100 ml of fuel.

| Results: | Before Separator | After 1st Stage |
|---|---|---|
| | Water = 1767 ppm | 84 ppm |
| | | After 2nd Stage |
| | | 7 ppm |
| | Particles = 401,887/100 ml | 106/100 ml |

EXAMPLE 4

A sample of No. 2 household furnace oil contaminated with an unknown amount of dirt and water was obtained from Dayton Power Co., Dayton, Ohio. The test apparatus wasthe same as that used in Example 1.

| Results: | Before Separation | After Separation |
|---|---|---|
| | Water = 1.66% | 1st stage 96 ppm |
| | | 2nd stage 5 ppm |

EXAMPLE 5

A sample of type Mil H 83282 was obtained from the Boeing Vertol Co. Water in the amount of approximately 3% by weight was added to the sample. No measurements of particles were made for this test.

| Results: | Before Separation | After Separation |
|---|---|---|
| | Water = 3.27% | 1st stage 84 ppm |
| | | 2nd stage 2 ppm |
| | (no particle counts made) | |

The present invention further provides a method of delivering the fuel from the fuel tank 12 to the engine 20. Generally, the method includes the steps of drawing the fuel from the fuel tank 12, separating substantially water and particle free fuel permeate flow from the drawn fuel retentate flow, conducting the substantially water and particle free permeate flow to the engine 20 and conducting the retentate fuel flow back to the fuel tank 12.

More specifically, the system is operated by pumping fuel from the fuel tank 12 to the first separator module 22. Within the first separator module 22, the fuel is conducted tangentially relative to the inner surfaces 44 of the plurality of microporous hydrophobic hollow fiber membranes 40. Pump 52 continuously moves the permeate 62 through the first passageway 24 to the injector 26 thereby maintaining a gradient across the membranes 40 and positively effecting fluid dynamics. The fuel retentate flow is conducted through conduits generally indicated at 30 back to the fuel tank 12. The conducted retentate fuel flow can be decontaminated of dissolved water and dissolved water soluble components by passage through the second separator module 66 containing the hydrophilic cuproammonium regenerated cellulose fibers. The separated water and dissolved water soluble component flow is then removed from the system through conduit 80 and the fuel flow retentate is conducted to the tank 12 through conduit 76.

In the second separator module 66, the stream of fuel retentate is passed directly in contact with and along the length of a plurality of first uninterrupted and unsupported outer surfaces of a plurality of hollow nonporous cuproammonium cellulose membrane fibers, the fibers being selectively permeated by diffusion with only water and dissolved water soluble components from the fuel retentate. This process is described in greater detail in the copending patent application Ser. No. 880,783, filed July 1, 1986.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A fuel delivery system (10) for supplying fuel from a fuel tank (12) to an engine (20), said system (10) comprising: fuel tank means (12) for storing a supply of fuel (16) including a tank outlet; first tangential flow separator means (22) including a hydrophobic microporous membrane (40) for separating by cross-flow separation a substantially water and particle free fuel permeate flow from a fuel retentate flow and including a separator inlet, retentate outlet and permeate outlet; first conduit means (18) in fluid communication between said permeate outlet of said first tangential flow separator means (22) and the engine for conducting the fuel permeate flow to the engine (20) and a second conduit means (30) in fluid communication between the engine (20) and fuel tank (12) for conducting the fuel retentate flow back to said fuel tank means (12).

2. A system as set forth in claim 1 further characterized by said tangential flow separator means including at least one separator module (22) having said inlet (32), said permeate outlet (34) in fluid communication with said first conduit means (18) and said retentate outlet (36) in fluid communication with said second conduit means (30), said separator module (22) including a first chamber (42) in fluid communication between said inlet (32) and said retentate outlet (36) defining a first flow path and a second chamber in fluid communication with said first outlet said hydrophobic microporous membrane (40) separating said first and second chambers, said membrane (40) extending parallel to said flow path (48) and tangentially contacting the length of said flow path (48).

3. A system as set forth in claim 2 further characterized by said membrane, comprising a plurality of hollow fibers (40) having inner passageways (42) extending therethrough, said separator module (22) including an outer housing (38) defining said second chamber, said inner passageway (42) defining said first chambers.

4. A system as set forth in claim 3 further characterized by said fibers (40) comprising a homogeneous layer of microporous material made from the group including polypropylene and tetrafluoroethylene fluorocarbon resins.

5. A system as set forth in claim 1 further characterized by including second tangential fluid separator means in fluid communication with said second conduit means between said first tangential flow separator means and said fuel tank means for separating water and dissolved water soluble components for a second fuel retentate and conducting the water and dissolved water soluble components out of said system (10) and conducting said second fuel retentate to said fuel tank means (12).

6. A system as set forth in claim 5 further characterized by said second tangential fluid separator means (66) including diffusion means consisting essentially of unsupported nonporous cuproammonium cellulose hollow fiber membranes having continuous noninterrupted inner and outer surfaces for allowing only diffusion of water and dissolved water soluble components from the retentate fuel flow through one of said surfaces, said system (10) including water removing means for removing water from the other of said surfaces.

7. A system as set forth in claim 6 including vehicle engine exhaust conduit means (60) for conducting engine exhaust to and from said second separator means (66), said exhaust conduit means (72) being in fluid communication with said other surface of said cuproammonium membranes for providing a sweep stream of engine exhaust tangentially across said other surface and out of said system (10).

8. A system as set forth in claim 7 further characterized by said first mentioned surface of said cuproammonium membranes being said outer surface thereof and said other surface of said cuproammonium membranes being said inner surface thereof.

9. A system as set forth in claim 1 further characterized by including second tangential fluid separator means (66) in fluid communication with said conduit means (18) between said first tangential flow separator means (22) and said engine (20) for separating water and dissolved water soluble components from a second fuel retentate and conducting the water and dissolved water soluble components out of said system (10) and conducting said second fuel retentate to said engine (20).

10. A system as set forth in claim 9 further characterized by said second tangential fluid separator means (66) including diffusion means consisting essentially of unsupported nonporous cuproammonium cellulose hollow fiber membranes having continuous noninterrupted inner and outer surfaces for allowing only diffusion of water and dissolved water soluble components from the retentate fuel flow through one of said surfaces, said system (10) including water removing means for removing water from the other of said surfaces.

11. A system as set forth in claim 10 including vehicle engine exhaust conduit means (60) for conducting engine exhaust to and from said second separator means (66), said exhaust conduit means (72) being in fluid communication with said other surface of said cuproammonium membranes for providing a sweep stream of engine exhaust tangentially across said other surface and out of said system (10).

12. A system as set forth in claim 8 further characterized by said first mention surface of said cuproammonium membranes being said outer surface thereof and said other surface of said cuproammonium membranes being said inner surface thereof.

13. A system as set forth in claim 1 further characterized by including pump means for actively pumping fuel from said fuel tank means (12) and through said conduit means (18) to the engine (20) at an axial flow rate of about one meter per second to three meters per second.

14. A system as set forth in claim 13 further characterized by said pump means including a primary pump (50) operatively connected to said conduit means (18) between said fuel tank means (12) and said first separator means (22).

15. A system as set forth in claim 14 further characterized by said pump means including a secondary pump (56) operatively connected to said conduit means (18) between said first separator means (22) and the engine (20).

16. A system as set forth in claim 15 further characterized by including fuel injector means (26) in fluid communication With said first passageway (24) for injecting the fuel permeate into the engine (20).

17. A system as set forth in claim 16 further characterized by said conduit means (18) including a third passageway (60) in fluid communication between said fuel injector means (26) and said fuel tank (12) for conducting overflow fuel from said fuel injector means (26) to said fuel tank (12).

18. A method of delivering fuel from a fuel tank (12) to an engine (20), said method including the steps of: drawing the fuel from the fuel tank (12); separating through a cross-flow semipermeable membrane (40) substantially water and particle free fuel permeate flow from the drawn fuel retentate flow; conducting the substantially water and particle free fuel permeate flow to the engine (20); and conducting the retentate fuel flow to the fuel tank (12).

19. A method as set forth in claim 18 wherein said separating step is further defined as conducting the flow of fuel tangentially relative to a surface (44) of a plurality of microporous hydrophobic hollow fiber membranes (40) and maintaining a gradient of fuel permeate across the membranes (40).

20. A method as set forth in claim 19 wherein said maintaining step is further defined as continually removing the permeate from the opposite side (46) of the membrane (40).

21. A method as set forth in claim 20 wherein the conducting step is further defined as conducting the flow of fuel across the inner surfaces (44) of the microporous membrane fibers (40) and removing the permeate from the outer surfaces (46) of the microporous membrane fibers (40).

22. A method as set forth in claim 20 further including the step of removing dissolved water and dissolved water soluble components from the fuel retentate and conducting the fuel retenate to the fuel tank (12) and conducting the water and dissolved water soluble component permeate out of the system (10).

23. A method as set forth in claim 22 wherein said removing step is further defined as passing the stream of fuel retenate directly in contact with and along the length of a first uninterrupted, unsupported surface of a plurality of hollow, nonporous cuproammonium cellulose membrane fibers, selectively permeating the fibers by diffusion with only water and dissolved water soluble components from the fuel retenate and conducting the retenate from the cellulose membranes to the fuel tank (12) and exhausting the permeate from the cellulose membranes from the system (10).

24. A method as set forth in claim 23 wherein the exhausting step is further defined as conducting engine exhaust gases over a second of the surfaces of the cellulose membrane fibers and removing the gases containing the water and dissolved water soluble components from the system (10).

* * * * *